Sept. 10, 1940.　　　　G. F. DRAKE　　　　2,213,956

CONDITION REGULATING SYSTEM

Filed June 21, 1937　　　5 Sheets-Sheet 1

INVENTOR
George Forrest Drake
BY
Parker, Carlson, Pitzner & Hubbard
ATTORNEYS

Sept. 10, 1940. G. F. DRAKE 2,213,956
CONDITION REGULATING SYSTEM
Filed June 21, 1937 5 Sheets-Sheet 2

INVENTOR
George Forrest Drake
BY
Parker, Carlson, Pitzner, Hubbard
ATTORNEYS

Sept. 10, 1940.  G. F. DRAKE  2,213,956
CONDITION REGULATING SYSTEM
Filed June 21, 1937   5 Sheets-Sheet 4

INVENTOR
George Forrest Drake
BY Parker, Carlson, Pitney & Hubbard
ATTORNEYS

Sept. 10, 1940.     G. F. DRAKE     2,213,956
CONDITION REGULATING SYSTEM
Filed June 21, 1937     5 Sheets-Sheet 5

INVENTOR
George Forrest Drake
BY
ATTORNEYS

Patented Sept. 10, 1940

2,213,956

UNITED STATES PATENT OFFICE 2,213,956

CONDITION REGULATING SYSTEM

George Forrest Drake, Rockford, Ill., assignor to Barber-Colman Company, Rockford, Ill., a corporation of Illinois Application June 21, 1937, Serial No. 149,411

18 Claims. (Cl. 236—68)

This invention relates generally to systems for automatically controlling conditioning apparatus to maintain uniform the condition of a medium to be controlled and has more particular reference to the control of building heating systems.

Modern buildings are generally heated by apparatus controlled by a thermostat usually located in the space to be heated and arranged to detect changes in temperature relative to a value desired to be maintained. In response to temperature variations, the thermostat operates to govern the operation of a regulating device, for example, to open and close a valve, start or stop a burner, change the position of a valve or damper, etc. The major causes tending to increase the minimum variation of the room temperature which can be obtained in such systems are (1) changes in the weather conditions, (2) lag in the response of the heat source to a change in the condition of the room thermostat, (3) lag in the controlling mechanism, that is, the interval between the time when the thermostat calls for or ceases to call for heat and the time when the heat is turned on or off, (4) the time required for the heat to move from the source to the thermostat, (5) the lag in the response of the thermostat to air temperature changes, and (6) the differential of the thermostat which in the case of control systems of the so-called floating type is the temperature change required to move the thermostat tongue from one contact to the other and close the electric circuit through each.

The detrimental effect of the first five factors will vary with different systems. The differential of the thermostat is fixed by establishing a compromise between high sensitivity on one hand and ruggedness and economy of construction on the other, the minimum differential of most present day room thermostats being one to two degrees Fahrenheit. It follows, therefore, that the minimum variation which can be obtained with ordinary temperature control systems is equal to the minimum one to two degree differential of the thermostat, plus the aggregate of the variations due to the other causes above mentioned.

The general object of the present invention is to provide a novel method of controlling conditioning apparatus so that the effects of the above mentioned detrimental factors are effectually overcome and the condition to be controlled is maintained substantially invariable under ordinary conditions of service operation.

Another object is to improve upon automatic control systems of the so-called floating type wherein the position of the condition regulating device continues to change during the time that the condition to be controlled deviates from the desired value as distinguished from systems of the so-called proportioning type in which the position of the regulating device varies in proportion to the deviation. Accordingly, the invention aims to provide a novel floating type control in which correction is made for a deviation of the condition being controlled from the desired value at a rate proportional to the amount of such deviation.

A more detailed object is to vary the capacity of a conditioning apparatus in accordance with changes in the effective position of a control means which is oscillated back and forth continuously irrespective of the value of the condition being controlled, the opposite movements remaining uniform while the desired value of the condition persists and varying in extent in a direction corresponding to and by an amount proportional to the amount of any deviation of the condition from said desired value.

The invention also resides in the novel mechanism for and method of defining the cyclic operation of the regulating means.

Another object is to provide a novel means for rendering the cycling mechanism ineffectual under abnormal conditions, for example, in very mild weather.

Other objects and advantages of the invention will become apparent from the following detailed description taken in connection with the accompanying drawings, in which Figure 1 shows a section of a building equipped with a heating system embodying the features of the present invention, the parts of the system being schematically arranged.

Figs. 5, 6, 7, 8 and 8ª are time charts illustrating conditions of operation of the system.

Figure 9:
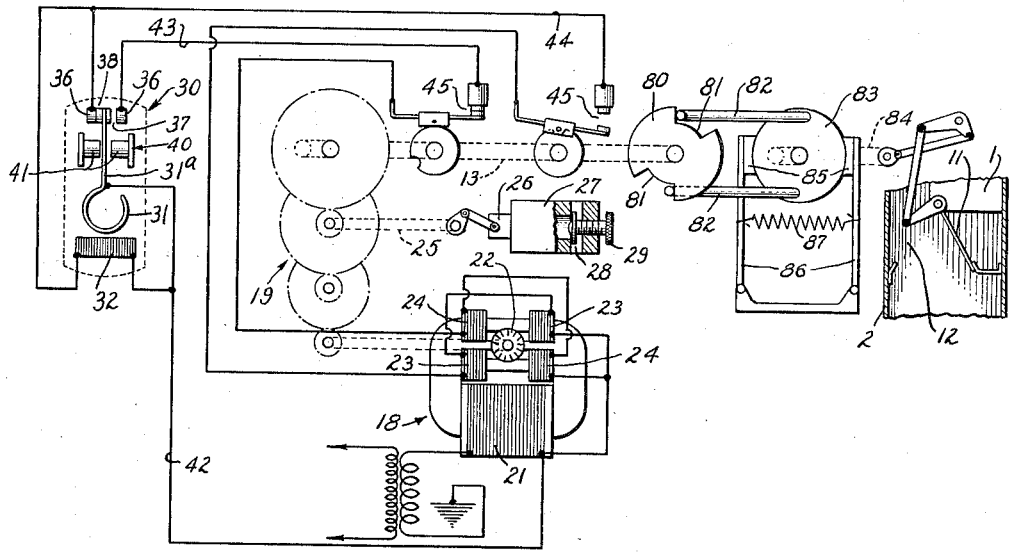
Figure 10:
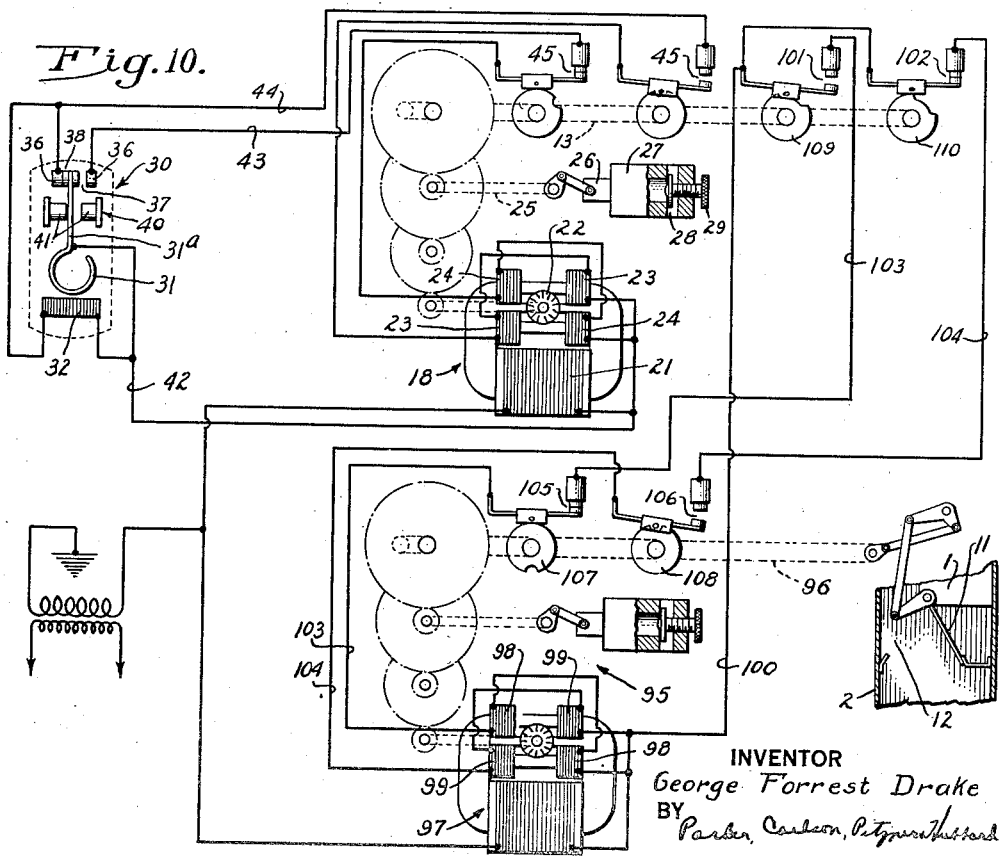

Figs. 9 and 10 are schematic views and wiring diagrams showing modified forms of the invention.

Figure 8:
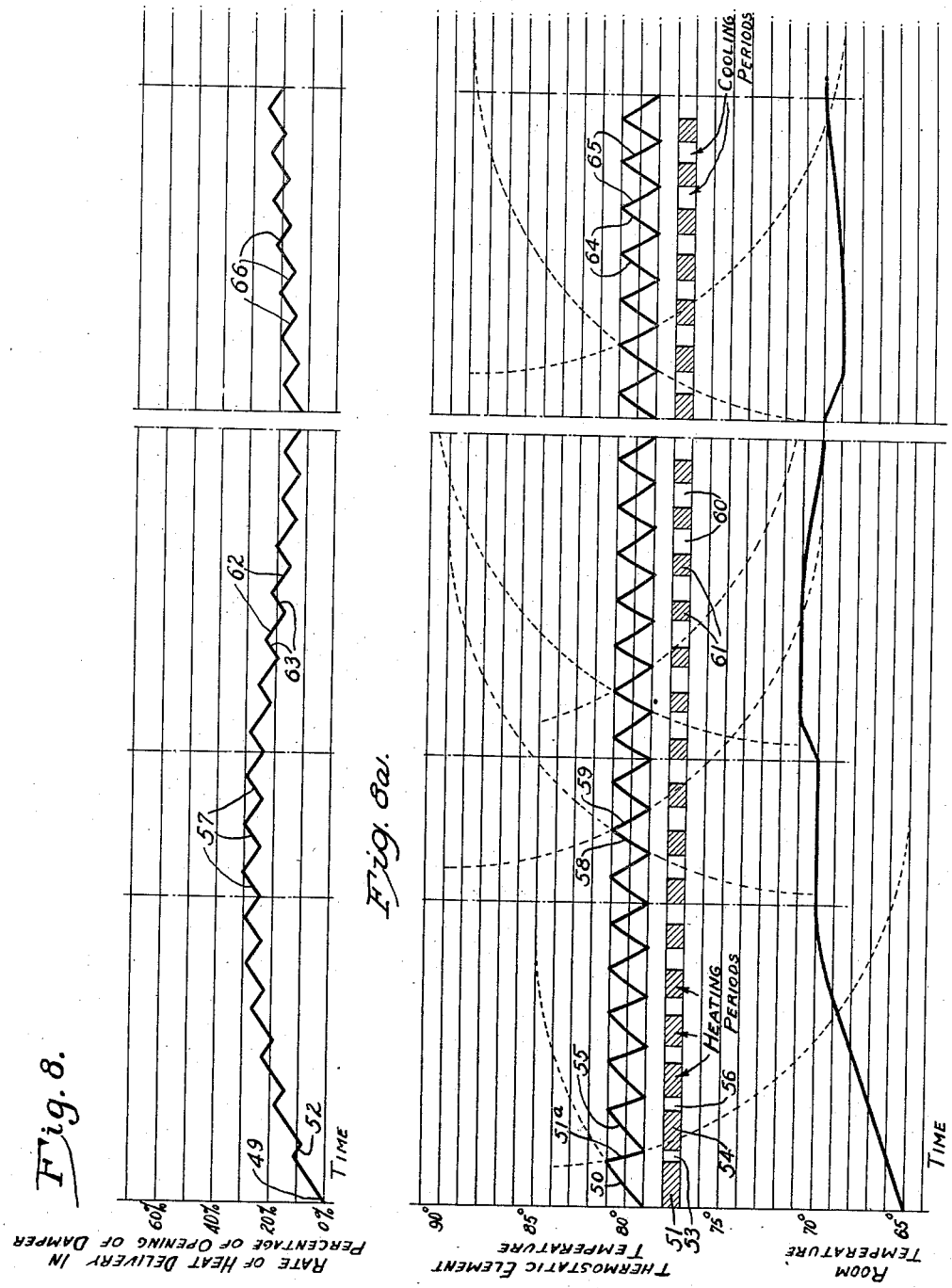
Figure 11:
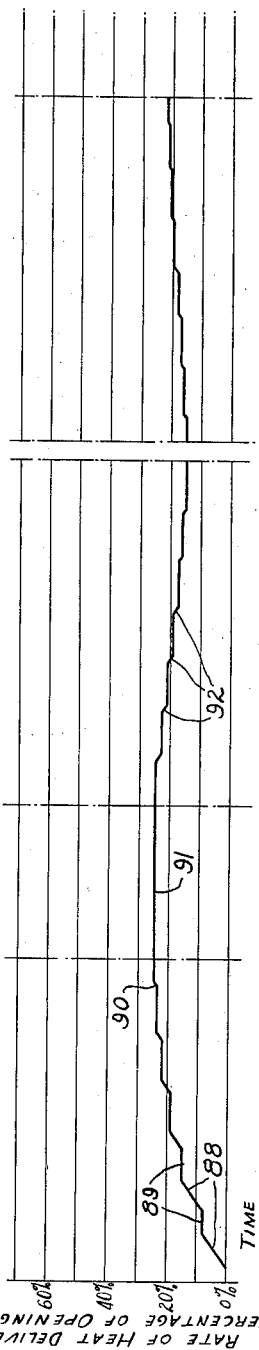

Fig. 11 is a time chart similar to Fig. 8 illustrating the movements of the heat regulating device when controlled by the systems shown in Figs. 9 and 10.

While the invention is susceptible of various modifications, I have illustrated in the drawings and will herein describe in detail the preferred embodiment and method of practicing the invention. It is to be understood, however, that I do not intend to limit the invention by such disclosure but aim to cover all modifications and alternative methods and constructions falling within the spirit and scope of the invention as expressed in the appended claims.

My improved method may be utilized effectually to control different types of conditioning apparatus in which there is a substantially invariable relation between the capacity of the conditioning apparatus to change the condition of the medium being controlled and the position of a regulating member which is movable progressively back and forth to vary at a relatively slow and graduated rate. As an example of such apparatus, I have illustrated in the drawings a heater of the so-called unit ventilator type wherein heat is supplied to the space to be heated by introducing into the space a current of air warmed by contact with a radiator 1 located within a duct or casing 2 having one or more air inlets 3 and an outlet 4 from which the heated air is discharged by the action of a suitable power driven blower 5.

Figure 1:
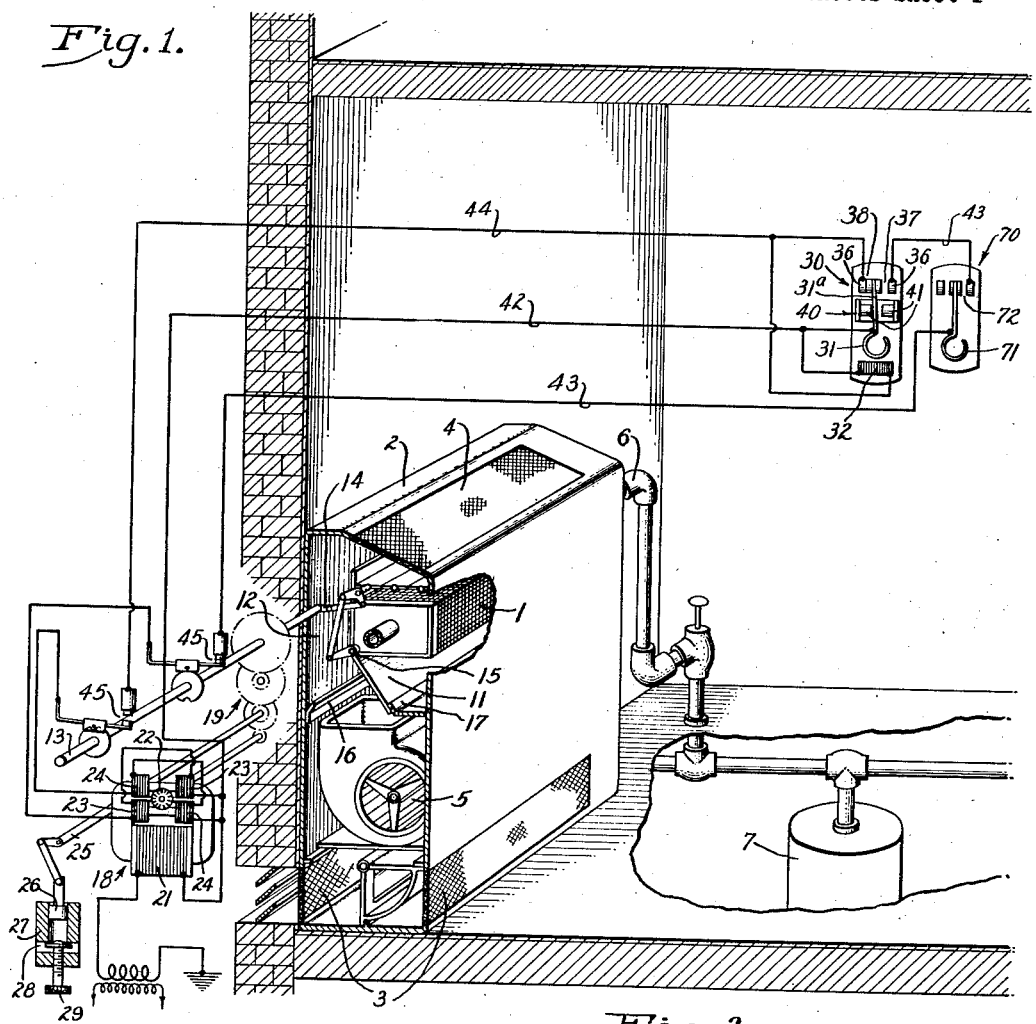
Figure 4:
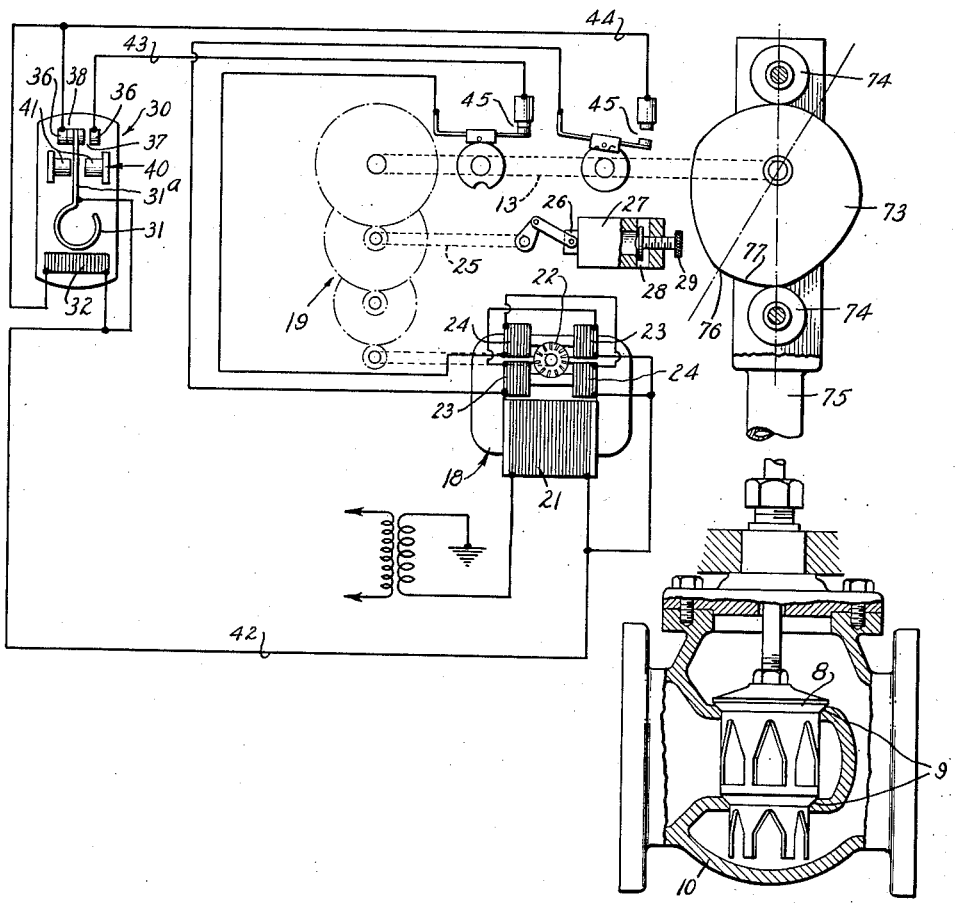
Fig. 4 is a schematic view and wiring diagram of a modified form of the invention.
Figure 5:
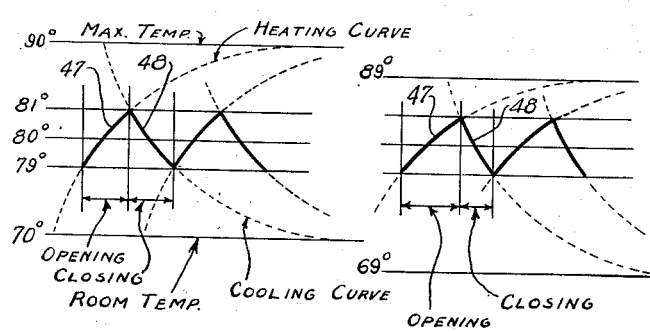

The radiator comprises a coil having an inlet 6 communicating with and continuously supplied with heating fluid such as steam from a boiler or other primary source indicated diagrammatically at 7. With a heater of this type, the regulating member for varying the heating effect of the heater may, as is shown in Fig. 4, take the form of a valve member 8 movable toward and away from seats 9 in a casing 10 to vary the amount of steam admitted to the heater coil 1. More frequently, the amount of heat delivered by a unit ventilator is governed as shown in Fig. 1 by moving a damper 11 back and forth between full-heating and full-cooling positions in a by-passage 12 thereby varying the proportion of the air which passes through the heater coil. In either of these exemplary constructions, it will be observed that the amount of heat delivered to the air current is determined by the position of the regulating member and will be substantially invariable for any given position thereof.

As applied to a temperature regulating system of the above general character, the invention contemplates varying the capacity of the heater in accordance with changes in the effective position of a movable control means which is oscillated back and forth continuously irrespective of the prevailing temperature in the space being heated through distances which are maintained of uniform lengths while the temperature in the space being heated remains at a predetermined value. During the continuance of any deviation in the space temperature from the desired value, the lengths of the movements of the control means in one direction are increased relative to the lengths of the opposite movements so that the effective position of the control means will be changed in increments having lengths proportional to the amount of such temperature deviation. Accordingly, the heating capacity of the heater which corresponds to the effective position of the control means will be changed at a rate proportional to the degree of temperature deviation and such change will continue so long as the deviation persists.

In the form of the invention shown in Fig. 1, the movable control means above referred to takes the form of an operating shaft 13 which is connected directly to the regulating member or damper 11 so that the two always move in unison. Herein a crank arm 14 fast on the shaft 13 is connected by a suitable linkage to the damper 11 so that by oscillation of the shaft, the damper may be swung about its pivot 15 between a full-heating position against a stop 16 in which position the entire air current is directed through the coil 1 and a closed or full-cooling position against a stop 17 in which position all of the air is by-passed around the heater coil. Thus as the shaft 13 oscillates back and forth between its limit positions, the amount of heat delivered to the air current and therefore to the space to be heated will be varied progressively being substantially constant for any given position of the damper 11.

The operating shaft 13 is driven by an electric motor 18 through speed-reduction gearing 19 constructed to produce movement of the damper 11 at the desired rate. The motor shown is of the induction type including a stator constantly energized by the application of alternating current to a main winding 21 and having two poles defining a cylindrical recess in which is disposed a rotor 22 of the squirrel cage type. Operation of the motor in one direction or the other is initiated by the selective short-circuiting of shading coils 23 and 24 each comprising a relatively large number of turns of wire. The coils 23 are connected in series and enclose corresponding side portions of the poles on diametrically opposite sides of the rotor while the coils 24 enclose similar sections of the poles on the other sides of the poles.

When the coils 23 are short-circuited with the coils 24 open-circuited, the current induced in the short-circuited coils will act in a well known manner to produce shifting of the magnetic field around the rotor 22 in a counter-clockwise direction resulting in operation of the motor in a direction to move the damper 11 toward full-heating position. Similarly, when the coils 24 are short-circuited and the coils 23 ineffectual, the motor will run in a direction to decrease the rate of heat delivery.

To enable the rate of movement of the damper to be regulated, the operator is preferably immersed in a bath of lubricating fluid and a high speed shaft 25 carries a crank arranged to reciprocate a piston 26 within a cylinder 27. Oil is thus pumped alternately into and out of a restricted opening 28 controllable by manipulation of a hand regulating screw 29. By varying the area of the pump opening, the speed of the valve operator may be changed as desired.

In order that the improved method may be carried out automatically, a novel timing device is employed for governing the operation of the motor 18 to define the alternate heat-increasing and heat-decreasing cycles above referred to regardless of the prevailing room temperature while at the same time varying the relative lengths of the control movements of the shaft 13 automatically in accordance with changes in the temperature within the space being heated. In the present instance, the timing device comprises a thermostat 30 having a thermosensitive element of which is alternately heated by an electric resistance heater 32 and cooled through an operating temperature range substantially above that in the space to be heated where the thermostat is suitably located.

The thermostat may be of ordinary construction comprising a segmental bimetallic element 31 having one end adjustably mounted upon an insulating base 33 cooperating with a cover 34 of insulating material to form a casing in which the element is housed. Holes 35 in the cover permit free circulation of air about the element. The other end of the thermostatic element is rigid with an elongated tongue 31ª movable back and forth between two stops 36 which limit the lateral movement of the tongue to a few thousandths of an inch and cooperate with a contact on the tongue to form two electric switches 37 and 38. By swinging the usual adjusting lever 39, the setting of the thermostat, that is, the temperature of the thermostatic element 31 at which the switches are operated, may be varied as desired.

For the purpose of avoiding variations in the temperatures at which opening and closing of the circuit through the switches 37 and 38 occur, the thermostat is equipped with a device which operates automatically to cause the tongue to move over-center in opposite directions with a quick snap action. Herein this device comprises a permanent magnet 40 secured to the base 33 and having alined poles 41 with faces of equal area disposed adjacent the stops 36 on opposite sides of the tongue 31ª which is composed of magnetic material so as to constitute an armature. Each of the pole faces is spaced at least ten times as far from the opposed tongue surface as the stops 36. The magnet thus constructed and arranged exerts an over-center action on the tongue armature and operates to maintain the tongue under pressure against one of the stops until sufficient energy has developed in the thermostatic element to overcome the magnetic force whereupon the tongue moves quickly against the other stop where it is held under an oppositely directed magnetic force of equal magnitude. This action, it will be observed, is obtained without introducing frictional forces to be overcome by the thermostat. As will appear later, the magnetic detent also insures that a predetermined change in the temperature of the thermostat will always occur in each heating and cooling cycle.

The thermostat switches 37 and 38 are arranged to short-circuit the respective coils 23 and 24 and for this purpose have their common contact connected by a conductor 42 to the terminal common to both pairs of shading coils. The contacts 36 are respectively connected by conductors 43 and 44 to the insulated terminals of the shading coils 23 and 24 with the result that whenever the switch 37 is closed, the coils 23 will be short-circuited and the motor operated in a direction to move the damper toward full-heating position while closure of the switch 38 will cause reverse movement of the damper. Limit switches 45 operated by cams on the shaft 13 are interposed in the conductors 43 and 44 and serve to render the control switches 37 and 38 ineffectual when the damper is disposed against the respective stops 16 and 17.

Figure 2:
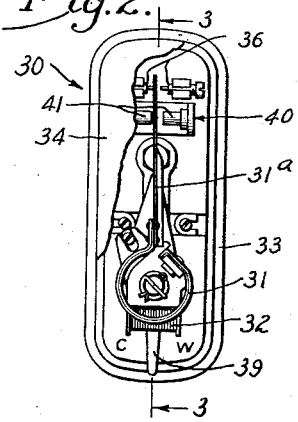
Fig. 2 is an elevational view of the timing thermostat used in the present systems, a portion of its casing being broken away.
Figure 3:
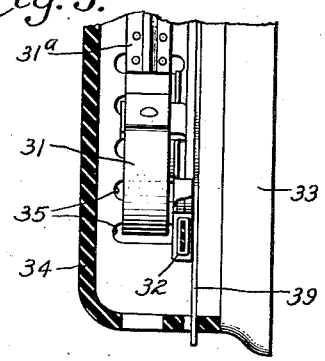
Fig. 3 is a fragmentary sectional view taken along the line 3—3 of Fig. 2.

The invention contemplates a construction of the electric heater 32 and location thereof relative to the thermostatic element 31 such that the heater will, if energized continuously, be capable of maintaining said element to a temperature substantially above that of the surrounding air, this differential preferably being approximately twenty degrees Fahrenheit when, as in the present instance, the control is used to govern the operation of a heating system of the character shown. Such a relatively large differential may be maintained in the thermostat above described by employing a heater utilizing approximately three tenths of a watt and positioned as shown in Figs. 2 and 3 between the element and the base 33 so that substantially the full length of the bimetallic element is influenced by the heat from the resistance heater.

To alternately energize and deenergize the electric heater 32 and thereby define heating and cooling cycles of the timing thermostat, current is applied to the heater during the movement of the damper in a direction to increase the rate of heat delivery. For this purpose, current is derived from the shading coils 24 and the heater 32 is interposed between the conductors 42 and 44 so as to be in parallel with the thermostat switch 38. With this arrangement, it will be apparent that the heater will be energized whenever the switch 37 is closed but will be short-circuited by closure of the switch 38. While the heater 32, when energized, does permit current to flow in the coils 24 and thereby oppose the shading effect of the coils 23 to some extent, such opposition does not reduce the output of the motor sufficiently to prevent proper operation of the regulating damper or valve by the coils 23.

In order to utilize the heater thermostat above described merely as a means for timing the opposite movements of the oscillatory control means and permit the latter to occur continuously irrespective of the prevailing room temperature as contemplated by the present invention, the thermostat is set to respond to a fixed temperature substantially higher than the temperature which it is desired to maintain in the room. That is to say, if the room temperature is to be 70 degrees Fahrenheit and the heater 32 is capable of heating the thermostatic element to a maximum temperature of 90 degrees when the room temperature is 70 degrees, the thermostat should be set for 80 degrees F. If, as is common with thermostats of the construction described, the thermostat operates with a two degree temperature differential, the switches 37 and 38 would, with the thermostat thus set, be closed when the element temperature is 79 degrees and 81 degrees respectively.

The temperature at which the thermostat is to be set in order to maintain the room temperature desired is determined by the room temperature, by the maximum temperature to which the element 31 would be heated by continuous energization of the heater 32, and by the relative speeds at which the damper is moved in opposite directions. This will be apparent from a consideration of the curves, Figs. 5, 6, and 7, which show graphically the rates at which the temperature of the thermostatic element would vary if heated by continuous energization of the heater at a room temperature of 70 degrees Fahrenheit and thereafter allowed to cool. From the heating curve 47, it will be seen that the rate of heating of the element 31 depends upon the difference between the prevailing temperature of the element and the maximum temperature to which the heater is capable of heating the element. Thus, the slope of the curve is greatest at or near the room temperature and at least at or near the maximum temperature. On the other hand, as shown by the cooling curve 48, the rate at which the element 31 cools decreases as the element temperature decreases, the rate of cooling, as indicated by the slope of the curve, being determined by the temperature differential between the element and the surrounding air. At temperatures midway between the room and maximum temperatures, the slopes of the heating and cooling curves are equal and a given temperature change of the thermostatic element will occur in the same time interval regardless of whether the element is heating or cooling.

To vary the relative lengths of the heating and cooling cycles of the thermostat and thereby change the mean position of the regulating member so as to correct automatically for any deviation of the room temperature from the value desired to be maintained and at a rate proportional to the amount of such deviation, advantage is taken of the fact that the rate of heating and cooling of the thermostat through its operating range, that is, 79 degrees F. to 81 degrees F., varies with changes in the room temperature. Thus, it will be observed from the full line portions of the curves 47 and 48 (Fig. 5) that at a room temperature of 70 degrees F., equal time intervals will be required for heating and cooling of the thermostatic element through its operating range with the result that the damper will be moved through the same distance in opposite directions in adjacent opening and closing cycles, the speed of the damper being the same in both directions with the operator constructed as above described. Under these conditions, the mean or effective position of the damper and therefore the average rate of heat delivery will remain constant.

Figure 6:
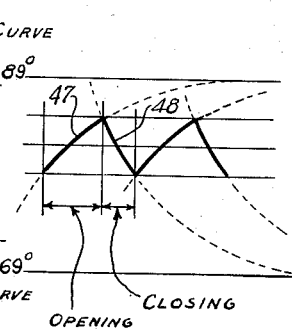
Figure 7:
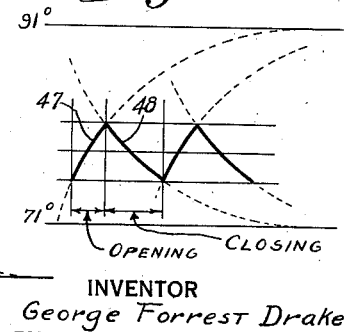

Now, if the room temperature falls to 69 degrees as illustrated in Fig. 6, the maximum theoretical temperature obtainable by the heater 32 will be lowered correspondingly, that is, to 89 degrees. Under these conditions, a longer period will be required to heat the thermostatic element from 79 degrees to 81 degrees owing to the decrease in the maximum temperature which decreases the rate of heating of the element through its operating temperature range. Also, since the fall in room temperature results in increasing the rate of cooling of the element, the time required for cooling of the element through the operating range is decreased thereby correspondingly shortening the cooling period. Conversely as illustrated in Fig. 7, a rise in room temperature will result in a more rapid heating but slower cooling of the thermostatic element through its operating range, the heating period being correspondingly shortened while the cooling period is lengthened.

From the foregoing, it follows that by locating the cycling thermostat in the space to be heated, the lengths of the heat-increasing and heat-decreasing cycles of the regulating damper or valve and therefore the rate at which heat is delivered will be varied automatically whenever the actual room temperature deviates any amount, however small, from the value desired to be maintained. The rate of change of heat delivered is proportional to the difference between the actual and the desired room temperature. This change in the rate of heat delivery will continue in the successive cycles of the cycling thermostat until the deviation has been compensated for, and equilibrium has again been established between the mean rate of heat delivery and the rate of heat loss from the space.

Now referring to the time temperature charts shown in Fig. 8 and considering the normal operation of the heating system shown in Fig. 1, let it be assumed that 70 degrees F. is the temperature to be maintained, that the cycle defining thermostat possesses the characteristics mentioned above and is set to close its switches 37 and 38 at 79 and 81 degrees respectively, that the operating shaft 13 is moved by the motor at equal speeds in opposite directions, and that the intervals required for heating and cooling of the thermostat through its operating range are only a small fraction of the time required for movement of the shaft through its full operating range. Also, let it be assumed that when steam is made available to the heater coil, the damper 11 is closed against the stop 17 as shown in Fig. 1, that the temperature of the room is 65 degrees F., and that the thermostatic element 31 is at 79 degrees due to previous operation of the electric heater 32.

Under the above conditions, the thermostat switch 37 would be closed, thereby short-circuiting the shading coils 23 to cause operation of the motor in a direction to open the passageway through the heater coil, that is, to move the damper away from closed position as indicated at 49 (Fig. 8). The electric heater 32 would also be energized from the shading coils 24 causing the temperature of the thermostatic element to rise as indicated at 50. Owing to the low room temperature, the rate of rise of the element temperature, as indicated by the dotted extension of the heating curve 50, is slow and the interval 51 required for the element temperature to reach 81 degrees is correspondingly long; consequently, the damper is moved through a substantial distance, for example, ten per cent of its full range of movement. When the element has been heated to 81 degrees and sufficient energy thus accumulated to overcome the magnetic force of the detent, the thermostat switch 37 is opened and the switch 38 is closed quickly with the result that the heater 32 is short-circuited and thereby rendered ineffectual and the motor coils 24 are effectually short-circuited to cause reverse movement of the damper. Due to the low room temperature, the element 31 cools through the operating range rapidly along a steep part of the cooling curve 51ª, and the damper moves back only a short distance 52 during the cooling interval 53, the net effect of the movements 49 and 52 being to leave the damper a substantial distance away from its closed or starting position.

During the first heating and cooling cycles of the cycling thermostat, heat will have been supplied to the room increasing the temperature of the latter with the result that the next heating period 54 of the thermostat, which is initiated by reverse movement of the thermostat tongue when the element 31 cools to 79 degrees, will be shorter than the first period owing to the increased rate of heating resulting from the increased room temperature. As the element heats as indicated at 55, the damper will move toward full-heating position a distance substantially greater than the backward movement 52 but less than its first movement 49 due to the increase in the maximum temperature to which the heater 32 is capable of heating the element 31. Similarly, the next cooling cycle 56 will be longer than the first cycle 53. It will be observed, therefore, that since the rate of change in the amount of heat being delivered is proportional to the difference between the actual and the desired room temperature, the mean rate of delivery of heat to the room will increase at a rapid rate when the temperature is near 65 degrees, for example, but as the room temperature approaches 70 degrees due to the addition of more and more heat to the room as the damper moves farther away from closed position, the successive damper opening intervals will decrease in length while the closing cycles increase in length resulting in a shortening of the net increments of movement of the shaft 13 and causing the mean rate of heat delivery to be increased at slower and slower rates. Finally when the room has been heated to 70 degrees, the heating and cooling of the thermostat will occur along the portions of the heating and cooling curves 58 and 59 which are of the same slopes with the result that the heating and cooling periods of the thermostat and therefore the opening and closing movements of the damper are of equal duration. Thus, the damper oscillates back and forth constantly as indicated at 57 about a mean position, for example, 27.5 per cent of full open position at which position the amount of heat delivered to the room just balances the heat losses therefrom. This condition prevails as long as the room remains at 70 degrees.

To illustrate the manner in which room temperature fluctuations are corrected automatically, assume that the temperature of the room is increased suddenly to 71 degrees which might occur when a number of people come into the room. Such a change produces a corresponding decrease in the rate at which the thermostatic element cools and an increase in its rate of heating through the operating range. As a result, the cooling periods 60 are of longer duration and the heating periods 61 shorter, the effect of which is to increase the damper closing movements 62 and decrease the opening movements 63 relative to each other. The net result is to cause the mean position of the damper to drift closer and closer toward closed position until a mean position, for example 17 per cent of full opening, has been established at which the amount of heat being delivered by the heater plus that supplied by the people balances the heat loss at the desired 70 degree room temperature. It will be observed that any rise in temperature above 70 degrees, however small this rise may be, will cause a change in the mean position of the damper, and correction for this rise will continue at a rate proportional to the amount of such rise as long as the rise persists.

After the desired room temperature has been established again, let it be assumed that the temperature falls to 69 degrees as a result, for example, of a decrease in the temperature outside of the building. In such a case, the rate of heating of the thermostat through its operating range would be decreased and the rate of cooling would be increased which would cause a lengthening of the heating periods 64 and shortening of the cooling periods 65. The damper movements would be changed correspondingly resulting in a gradual shifting of the mean position away from closed position as shown by the movements 66 until the heat delivered, for example, with a mean position of 22 per cent, just balances the increased rate of heat loss.

Changes in the mean rate of heat delivery in the manner above described will occur in response to any deviation, however small, of the room temperature from that desired to be maintained as determined by the setting of the thermostat, the one degree variations above referred to having been assumed merely for convenience of illustration.

From the foregoing, it will be observed that the thermostat operates simply as a means for timing the movements of the oscillatory control means by which the effective heating capacity of the heater is governed. The action of the thermostat is influenced by deviations in room temperature from the value desired to be maintained but only for the purpose of varying the relative lengths of the heating and cooling cycles of the thermostat and thereby change the mean position of the damper to correct for a change in the rate of heat loss from the space being heated. Such correcting action occurs gradually over a number of combined heating and cooling cycles of the thermostat because the rate of correction is directly dependent upon the difference between the actual room temperature and that desired to be maintained. In other words, the rate of correction is increased as the unsatisfactory temperature condition in the room becomes more and more aggravated. Since the rate of correction only and not the point of control by the thermostat is changed, the present system overcomes the difficulties inherent in temperature systems heretofore used. For a given rate of correction, the present system will hunt substantially less than prior systems of the floating type.

The lengths of the opening and closing movements of the damper are of course determined by the speed of the damper and the capacity of the heater to heat the thermostatic element, both of which factors may be varied as desired according to the operating conditions, it being apparent that the mean position of the damper, when an equilibrium condition has been obtained, will be the same regardless of the length of the damper movements. For example, in a system of the character shown in Fig. 1, good results have been obtained by constructing the thermostat heater 32 to produce heating and cooling periods of approximately two minutes' duration, four minutes being required for a combined heating and cooling cycle.

The control above described is particularly advantageous in that wide temperature deviations are corrected for rapidly while the rate of correction in response to small deviations is slow, and this in spite of the employment of an oscillatory control means for varying the capacity of the heater. These advantages are obtained by employing a thermostat set for response to temperatures substantially above, for example ten degrees, the room temperature to be maintained and by utilizing an electric heater of sufficient capacity to cause rapid heating of the thermostat through its range. In addition, the motor operator is so adjusted that the time required for movement of the regulating damper through its operating range is several times as great as the intervals required for heating and cooling of the thermostat through its operating range.

Owing to the presence of the magnetic detent 40, the operating temperature range of the thermostat 30 and therefore the lengths of the heat-increasing and heat-decreasing cycles is not influenced by normal changing conditions, such for example, as the condition of the switch contact surfaces. This is for the reason that the tongue contact remains against one stationary contact until sufficient temperature change has occurred and the necessary energy thereby accumulated in the thermostatic element to overcome the magnetic action which will, when the other contact is engaged, close the circuit independently of changes in the condition of the contact surface.

In order to change the temperature maintained in the room, it is merely necessary to change the setting of the thermostat 30. For example, if a higher temperature, say 72 degrees, is desired, the adjusting lever 39 is shifted so as to increase the operating range, for example to 81–83 degrees. Such adjustment would have the effect of increasing the rate of cooling and decreasing the rate of heating of the element 31 through the newly established operating range with the result that the heating periods would be longer than the cooling periods until an equilibrium condition is established in the manner previously described. Thus, the mean position of the damper would be shifted farther and farther away from closed position until the rate of heat delivery just equals the increased rate of heat loss from the space at the newly established temperature.

From the foregoing it will be observed that the thermostatic control above described contemplates a continuous oscillation of the regulating member about an equilibrium position at which the heat delivered balances the heat losses from the space. Therefore, if the changes, for example, in the weather, reduce the heating requirements to such a degree that the desired room temperature will be maintained without the addition of any heat over a substantial time interval, the room will, by normal operation of the control as above described, become overheated. The invention contemplates the provision of means to prevent the occurrence of such a condition. Such means may operate in various ways to interrupt the supply of heat. For example, the heater thermostat 30 may be disabled, the supply of heating fluid to the heater coil 1 may be interrupted, or the damper may be maintained in closed position at the same time permitting the operator to oscillate continuously.

In the form shown in Fig. 1, the heater thermostat is disabled automatically through the use of an auxiliary thermostat 70 located in the space being heated and set to respond to a temperature slightly above that maintained by the normal operation of the control as above described, for example, 72 degrees, if the thermostat 30 is set for 70 degrees. The thermostat 70 has a sensitive element 71 arranged to open and close a switch 72 which is interposed in the conductor 43. Thus, when the switch is open as will be the case when the room temperature rises above 72 degrees, the circuit to the shading coils 23 will be interrupted so that the damper operator cannot be run in the opening direction. As a result, the electric damper will periodically be moved by operation of the thermostat 30 until it comes to closed position against the stop 17. When this occurs the limit switch in the conductor 44 is opened deenergizing the heater 32. When the room temperature again falls below 72 degrees, the switch 72 will again be closed, whereupon the operation of the system will again be resumed and the equilibrium position of the damper will be established in the manner previously described.

In Fig. 4 is illustrated a mechanism for rendering the heater inoperative when the room becomes overheated without interrupting the operation of the timing thermostat. This mechanism includes a driving connection between the motor operator and the regulating member which permits oscillation of the main operating shaft of the operator back and forth while the member remains in closed position, thereby enabling the motor to operate idly under the control of the timing thermostat without admitting heat to the room. In this form of the invention, the valve member 8 which constitutes the regulating member, is reciprocated toward and away from its seat by a cam 73 fast on the shaft 13 of the motor operator and acting on follower rollers 74 carried by an extension 75 of the valve stem. The cam is shaped to impart slow and graduated movements to the valve member as the shaft 13 oscillates back and forth under the control of the heater thermostat, the valve being closed when the high point 76 on the cam engages the lower roller 74. Adjacent the high point of the cam is a dwell surface 77 of a circumferential length sufficient to allow continued movement of the shaft 13 through at least one normal heating period of the heater thermostat as indicated in Fig. 8, the valve remaining closed during this movement. The limit switch 45 is not opened by its cam until the dwell surface has moved substantially past the lower roller 74.

By thus extending the range of oscillation of the operator shaft, any position down to and including completely closed position may be established as the equilibrium position of the valve by operation of the cycling device. Thus, as the valve member is moved step-by-step to completely closed position in the manner above described, the operator may continue to operate and oscillate the shaft 13 back and forth during the heating and cooling intervals of the heater thermostat without opening the valve. In such a case, the lower roller 74 would follow the dwell surface 77 of the cam. Or if a very small amount of heat is needed, the follower may engage the dwell surface for only part of the cycling periods while maintaining the valve opened slightly during the remainder of the periods. In this way a mean position very close to completely closed position may be established.

The control last described is especially advantageous in that the cycling thermostat will not be allowed to cool below its operating range even though no heat is required for the room. This enables normal operation of the heater thermostat to be resumed immediately when heat is needed, thereby avoiding any overheating of the room in order to establish normal conditions as would be the case if the heater thermostat 30 were at room temperature when the system is rendered operative following a period of shutdown.

The action last described may also be obtained through the provision of a thermostatically controlled valve such as is shown in U. S. Patent No. 1,903,230 to Duncan J. Stewart for interrupting the flow of heating medium to the heater coil 1. In such a case, the auxiliary thermostat 70 would be set as above described and its two switches utilized to initiate successive opening and closing cycles of the power driven operator for an inlet valve controlling the flow of steam to the coil 1.

Instead of connecting the operating shaft 13 directly to the regulating member or damper 11 as in the form of the invention described above, the connection may include a lost motion device arranged to permit of idle oscillation of the shaft when the heating and cooling cycles of the room thermostat are of equal duration and cause movement of the damper only when one of the cycles is of greater duration than the other due to a deviation in the room temperature from the desired value. As shown in Fig. 9, the lost motion connection comprises a disk 80 fast on the shaft 13 and having peripheral slots 81 receiving cross pins 82 projecting from a drum 83. The latter is fast on a shaft 84 preferably coaxial with the shaft 13 and arranged to operate the damper 11 through the medium of suitable crank and link connections. The amount of lost motion provided is determined by the length of the slots 81.

The position of the damper may be maintained while the slack in the lost motion connection is being taken up by suitable means such as a friction brake. Herein, the brake comprises shoes 85 on pivotal arms 86 which are urged together by a spring 87 to hold the shoes in gripping engagement with the drum 83.

The adjusted speed of the motor operator and the amount of lost motion provided are such that the time required for movement of the shaft 13 through the lost motion range approximately equals the time during which the thermostat tongue remains in its opposite limit positions when the desired temperature prevails in the space being heated. Under such conditions, the shaft 13 will oscillate back and forth idly in successive heating and cooling cycles of the thermostat 30, and the position of the damper 11 will remain fixed. When, however, the room temperature falls below the desired value, the movement of the shaft in the heat-increasing or clockwise direction will, due to prolonged closure of the thermostat switch 37, be lengthened beyond the lost motion range so that after the slack in the connection has been taken up, the damper will be advanced in unison with the shaft 13 and in a direction to increase the rate of heat delivery. Then, when the movement of the shaft 13 reverses in the next cooling period, the new position of the damper will be maintained by the brake.

Movement of the damper in the opposite or heat-decreasing direction will occur in a similar manner when the shaft 13 moves beyond the limit of the lost motion in the counter-clockwise direction during the cooling periods of the thermostat while the room temperature is above the desired value. Thus, it will be observed that during the continuance of any deviation in the room temperature from the desired value, the position of the damper will be changed intermittently in small increments having lengths determined by the relative lengths of the adjacent heating and cooling intervals of the thermostat, the damper remaining stationary while the slack in the pin and slot connection is being taken up after a reversal in the thermostat temperature.

The action of this modified form of mechanism is illustrated in Fig. 11 which shows the manner in which the position of the damper changes with the modified arrangement shown in Fig. 9 under the same variations in room temperature as those assumed in the above description of the operation of the system shown in Fig. 1. For example, if the room temperature is substantially below the value desired, the damper 11 will, during successive heating cycles of the room thermostat, be advanced in the heat-increasing direction in relatively large increments as indicated at 88 and will remain stationary during the inintervening cooling intervals 89. As the room temperature approaches the desired 70 degree value, the increments of change in the damper position will decrease in length as indicated at 90. When the desired room temperature has been attained, the position of the damper will remain fixed during successive heating and cooling intervals as shown at 91. Similarly, when the room temperature rises above the desired value, which results in movement of the operating shaft 13 in the heat-decreasing direction beyond the lost motion range, the damper will move intermittently in increments 92 to reduce the capacity of the heater.

It will be observed from the foregoing that the net effect of changing the effective position of the damper in spaced intermittent steps with the arrangement shown in Fig. 9 is the same as that obtained with the mechanism shown in Fig. 1 in which the increment of change in the position of the damper in successive heating and cooling intervals is determined by the difference in the heat-increasing and heat-decreasing movements of the damper. With both controls, however, the effective position of the damper or heat regulating member continues to change so long as any deviation in the room temperature persists, the rate of such change over a succession of heating and cooling cycles of the room thermostat being proportional to the amount of the deviation of the same as with the mechanism shown in Fig. 1.

Movement of the damper or main regulating member in the manner illustrated in Fig. 11 may also be obtained with an equivalent electrical arrangement as shown in Fig. 10. In this modification, the operating shaft 13 and the motor operator therefor are utilized as a relay for controlling a second similar motor operator 95 which in turn actuates the damper 11 directly. The shaft 96 of the latter operator is driven at the same speed as the shaft 13 previously described by a reversible shaded pole induction motor 97 having sets of shading coils 98 and 99 respectively adapted when short-circuited to cause movement of the shaft 96 and the damper 11 connected therewith in directions to increase and decrease the capacity of the heating apparatus. One terminal of each set of coils is connected to a conductor 100 leading to the movable contacts of switches 101 and 102, the stationary contacts of which are joined to the insulated terminals of the shading coils 98 and 99 through conductors 103 and 104 respectively. Limit switches 105 and 106 are interposed in the latter conductors and are arranged to be opened by cams 107 and 108 when the damper operating shaft 96 is in the full cooling and full heating positions of the damper.

The switch 101 is controlled by a cam 109 fast on the shaft 13 and shaped to permit the switch to remain open during oscillation of the shaft when the heating and cooling cycles of the timing thermostat are equal and to close the switch when the shaft moves to a limit position in the heat-increasing direction as will be the case during a cooling cycle when the space temperature is below the desired value. The switch 102 is controlled by a cam 110 on the shaft 13 similarly shaped to maintain the switch open during normal oscillation of the shaft back and forth but to close the switch as the shaft approaches the limit position shown in Fig. 10 while moving in the heat-decreasing direction. The arrangement is of course such that the switches 101 and 102 will be closed by their respective cams just before the corresponding limit switches 45 become open as the shaft 13 reaches the opposite limits of its operating range.

With this modified arrangement, it will be observed that the shaft 13 will oscillate idly back and forth the same as with the arrangement shown in Fig. 9 so long as the heating and cooling intervals of the timing thermostat 30 are of equal duration. This will be the case when the room temperature is at the desired value. If, however, there is a fall in the room temperature which will result in a lengthening of the heat-increasing movement, the switch 101 twill become closed as the shaft 13 approaches its limit position. This will result in starting of the damper operator 95, and movement of the damper in the heat-increasing direction will be initiated and continue so long as the shaft 13 remains in the limit position, that is, during the remainder of the heating cycle of the room thermostat. As the shaft moves away from this position, the damper operator 95 will stop and thereafter will maintain the new position of the damper 11. In a similar way, the damper will be moved intermittently to decrease the rate of heat supply during the continuance of a rise in the space temperature above the desired value, the lengths of the increments of movement being proportional to the amount of the deviation. It will thus be seen that the action of this modified form of the control is the same as in the form shown in Fig. 9. In this case, however, the control means which oscillates back and forth to determine by its average position the effective position of the damper or heat regulating member proper is composed of two parts, namely, the shafts 13 and 96. Thus, the effective position of the damper is determined by the resultant of the combined motions of the shafts 13 and 96 which move in succession during any heating or cooling cycle of the timing thermostat of longer duration than the interval required for heating or cooling of the thermostat through its operating range when the room temperature is at the desired value.

This application is a continuation in part of my co-pending application Serial No. 717,732, filed March 28, 1934.

I claim as my invention:

1. Apparatus for controlling the temperature of a space to be heated comprising, in combination, oscillatory control means, power driven mechanism for moving said means in opposite directions at fixed speeds, a thermostat in said space normally controlling said mechanism to cause movement of said means in one direction when the thermostat temperature falls below a predetermined value and reverse movement when the thermostat temperature rises above a predetermined higher value, an electric heater adjacent said thermostat and energized when the space temperature is below a predetermined value, said heater having the capacity when energized continuously to heat said thermostat at least ten degrees above the prevailing ambient space temperature and said thermostat being adjusted for an operating range at least five degrees above the space temperature desired to be maintained, and regulating means controlled by the movements of said control means for delivering heat to said space at a variable rate determined by the relative lengths of the intervals required for heating and cooling of said thermostat through said operating range.

2. Apparatus for controlling the temperature of a space to be heated comprising, in combination, a thermostat responsive to temperature changes in said space and having a control element movable back and forth between spaced low and high temperature limit positions in response to heating and cooling of the thermostat through a predetermined temperature range, an electric heater associated with said thermostat and having the capacity to heat the same substantially above the ambient space temperature, said heater being energized and deenergized when said element is in said low and high positions respectively, a regulating member variably controlling the rate of heat supply to said space and movable within a predetermined operating range, and mechanism controlled by said thermostat to establish an effective position of said member corresponding to the relative lengths of the intervals during which said element is disposed in its respective limit positions, said mechanism including a power operator constructed ot move said member through its operating range in a time interval several times as great as the interval required for cooling or false heating of said thermostat through said temperature range.

3. Apparatus for controlling the temperature of a space to be heated comprising, in combination, a thermostat responsive to temperature changes substantially above the value to be maintained in said space and having a control element movable back and forth between spaced law and high temperature positions, an electric heater associated with said thermostat and having the capacity to heat the same substantially above the ambient space temperature, said heater being energized and deenergized when said element is in said low and high positions respectively, an electric motor driven mechanism immediately responsive to changes in the position of said element, control means driven by said mechanism and normally moved in one direction when said element is disposed in one of said positions and in the opposite direction when the element is in the other position, and means for delivering heat to said space at a rate corresponding to the effective position of said control means.

4. The combination with apparatus of variable capacity for conditioning a medium to be controlled of, means for detecting deviations in the condition of said medium from a predetermined value desired to be maintained including an instrument exposed to the medium and having a control element movable in opposite directions with opposite changes in the condition of said medium, a control member movable independently of said element, power driven mechanism controlled by said instrument and operating throughout the continuance of any departure in the condition of said medium from said predetermined value to change the effective position of said member in a direction corresponding to such departure and at a rate proportional to the amount of departure, the effective position of said member remaining constant while the condition of said medium remains at said desired value, and means for modulating the conditioning capacity of said apparatus in accordance with the changes in the effective position of said control member.

5. The combination with apparatus of variable capacity for conditioning a medium to be controlled of, means for detecting deviations in the condition of said medium from a predetermined value desired to be maintained including an instrument exposed to the medium, oscillatory control means, means for changing the mean effective position of said control means throughout a deviation in the condition of said medium from said predetermined value and at a rate proportional to the amount of such deviation, said means including a power driven mechanism controlled by said instrument and operating to oscillate said control means back and forth within a range of predetermined length as long as said condition remains at said predetermined value and to oscillate the control means back and forth but beyond said range when the condition deviates from such value, and means for modulating the effective conditioning capacity of said apparatus to correspond to the mean position of said control means.

6. The combination with apparatus of variable capacity for conditioning a medium to be controlled of, means for detecting deviations in the condition of said medium from a predetermined value desired to be maintained including an instrument exposed to the medium, a movable control means, power driven mechanism controlled by said instrument and operating throughout the continuance of any departure in the condition of said medium from said predetermined value to change the effective position of said control means in a direction corresponding to such departure and at a rate proportional to and determined solely by the amount of such departure, the effective position of said control means remaining constant while the condition of said medium remains at said desired value, and means for modulating the conditioning capacity of said apparatus in accordance with the changes in the effective position of said control means.

7. Apparatus for maintaining a predetermined condition in a medium to be controlled having, in combination, a regulating member movable in opposite directions to increase and decrease the value of said condition, a device for detecting deviations in said condition from a predetermined value desired to be maintained in said medium, and mechanism controlled by said device and operating throughout the continuance of any deviation of the medium from said predetermined value to change the effective position of said member and correct for such deviation at a rate proportional to the degree of deviation, the effective position of said member remaining fixed when the desired condition obtains in said medium.

8. An air heating system comprising, in combination, a heater, a control member movable back and forth to vary, according to its effective position, the rate of delivery of heat by said heater to the space to be heated, a power operator for actuating said member, a thermostat immediately controlling said power operator in response to temperature changes and acting to determine the direction and extent of movement of said member, said thermostat being set to call for heat at a temperature substantially higher than that to be maintained in said space and to cease to call for heat at a still higher temperature, and means providing a localized source of heat adjacent said thermostat while the latter is calling for heat and capable of heating the thermostat through its operating range, said heat source being interrupted when the thermostat ceases to call for heat.

9. An air heating system having, in combination, a heater for supplying heat to the space to be heated, a control member by which the rate of heat delivery may be increased and decreased progressively, timing means operable irrespective of the temperature prevailing in said space to cause oscillation of said member back and forth to establish a mean rate of heat delivery balancing the rate of heat loss from said space at the predetermined temperature to be maintained therein, said mean rate of delivery being varied automatically with variations in the space temperature from said predetermined temperature, and means for disabling said heater in response to continued overheating of said space while permitting continued oscillation of said member by said timing means during interruption of the heat supply.

10. In a system for maintaining a predetermined temperature in a space to be heated, the combination of a control means movable in opposite directions, means for varying the rate of delivery of heat to said space in accordance with changes in the effective position of said control means, timing means operating irrespective of the prevailing temperature in said space to move said control means alternately in opposite directions and responding to variations in the space temperature relative to said predetermined value to vary the relative length of the opposite movements, and thermostatic means operable automatically to render said timing means ineffectual when the space temperature rises to a predetermined point above said predetermined value.

11. For controlling the heating capacity of a heater to maintain a predetermined temperature in a space to be controlled, the method which comprises moving a control means alternately in opposite directions irrespective of the space temperature, maintaining the lengths of the opposite movements uniform while said predetermined temperature prevails in said space, increasing the lengths of the movements in one direction relative to the reverse movements during the continuance of a rise in the said space temperature above said value whereby to change the effective position of said member in one direction at a rate proportional to the amount of said rise, decreasing the lengths of the movements in said first direction relative to the movements in the second direction during the continuance of a fall in said space temperature below said value whereby to change the effective position of said member in the opposite direction at a rate proportional to the amount of said fall, and modulating the heating capacity of said heater to correspond to the mean effective position of said control means.

12. For use in a conditioning system in which the conditioning effect on a space to be conditioned is governed by the effective position of an oscillatory control means, the method which comprises continuously moving said means back and forth alternately in opposite directions irrespective of the condition prevailing in said space, maintaining the lengths of the opposite movements uniform while said condition of said space remains at a predetermined value, increasing the lengths of the movements in one direction relative to the reverse movements in proportion to and during the continuance of a rise in the space condition above said value, and decreasing the lengths of the movements in said first direction relative to the movements in the second direction in proportion to and during the continuance of a fall in the space condition below said value.

13. For controlling the conditioning capacity of a conditioning apparatus to maintain a condition to be controlled at a predetermined uniform value, the method which comprises continuously moving a control member back and forth alternately in opposite directions, maintaining the lengths of the opposite movements uniform while said condition remains at said value whereby to maintain a fixed mean position of the member, increasing the lengths of the movements in one direction relative to the reverse movements in proportion to and throughout the continuance of a rise in said condition above said value whereby to change the effective position of said member in one direction at a rate proportional to the amount of said rise, decreasing the lengths of the movements in said first direction relative to the movements in the second direction in proportion to and throughout the continuance of a fall in said condition below said value whereby to change the effective position of said member in the opposite direction at a rate proportional to the amount of said fall, and modulating the conditioning capacity of said apparatus to correspond to the mean effective position of said member.

14. For governing the conditioning capacity of a conditioning apparatus to maintain a predetermined condition in a medium the condition of which is to be controlled, the method which comprises increasing the effective capacity of said apparatus throughout the continuance of any decrease in the condition of said medium below said predetermined value and at a rate proportional to the amount of such decrease, decreasing said capacity throughout the continuance of any increase in the condition of said medium above said value and at a rate proportional to the amount of such increase, and maintaining said capacity substantially uniform while said predetermined condition obtains in said medium.

15. Apparatus for controlling the temperature of a spacing comprising, in combination, a thermostat responsive to temperature changes in said space and having a control element movable back and forth between spaced low and high temperature positions, an electric heater associated with said thermostat and having the capacity to heat the same substantially above the ambient space temperature, said heater being energized and deenergized when said element is in said low and high positions respectively, a power driven operator controlled by said thermostat and having a driven member movable between spaced limit positions and normally moved in one direction when said control element is disposed in one of said positions and in the opposite direction when the control element is in the other position, a modulating regulating device governing the heating capacity of said apparatus, and a second power operator controlled by the movements of said member and operating to move said device in one direction while the member is disposed in one of said limit positions and in the reverse direction while the member is in the other limit position.

16. The combination with apparatus of variable capacity for conditioning a medium to be controlled of, means for detecting deviations in the condition of said medium from a predetermined value desired to be maintained including an instrument exposed to the medium, an oscillatory control member, a power operator controlled by said instrument and operating to oscillate said member back and forth within a range of predetermined length while said condition remains at said predetermined value and to oscillate the member back and forth but beyond said range when the condition deviates from such value, a device movable independently of said member for modulating, according to its position, the conditioning capacity of said apparatus, and mechanism controlled by the movements of said member and operating to move said device in one direction while the member is disposed beyond said range in one direction and in the opposite direction when the member is positioned beyond the opposite limit of said range.

17. Apparatus for controlling the temperature of a space to be heated comprising, in combination, a thermostat responsive to temperature changes in said space and having a control element movable back and forth between spaced low and high temperature limit positions, an electric heater associated with said thermostat and having the capacity to heat the same substantially above the ambient space temperature, said heater being energized and deenergized when said element is in said low and high positions respectively, a power driven operator controlled by said thermostat and having a driven member normally moved in one direction when said control element is disposed in one of said positions and in the opposite direction when the control element is in the other position, a regulating device controlling said apparatus to establish a rate corresponding to its position, and a lost motion connection between said member and said device permitting idle oscillation of said member and independently of said device when said thermostatic element is disposed in said limit positions for substantially equal time intervals.

18. The combination with apparatus of variable capacity for conditioning a medium to be controlled of, means for detecting deviations in the condition of said medium from a predetermined value desired to be maintained including an instrument exposed to the medium and having a control element movable in opposite directions with opposite changes in the condition of said medium, a control member movable independently of said element, a regulating device governing, according to its position, the capacity of said apparatus, power driven mechanism controlled by said instrument and operating throughout the continuance of any departure in the condition of said medium from said predetermined value to change the mean position of said member in a direction corresponding to such departure and at a rate proportional to the amount of departure, and a lost motion connection between said member and said device operable to move the device in opposite directions during movements of said member beyond the opposite limits of the lost motion range.

GEORGE FORREST DRAKE.